UNITED STATES PATENT OFFICE.

HENRI TERRISSE, OF VERNIER, NEAR GENEVA, SWITZERLAND, ASSIGNOR TO FABRIQUE DE VERNIS ET PRODUITS CHIMIQUES SOCIÉTÉ ANONYME, OF VERNIER, SWITZERLAND.

SUBMARINE PAINT.

1,012,177.  Specification of Letters Patent.  Patented Dec. 19, 1911.

No Drawing.  Application filed October 28, 1909. Serial No. 525,139.

*To all whom it may concern:*

Be it known that I, HENRI TERRISSE, chemist, citizen of Switzerland, residing at Vernier, near Geneva, in the Canton of Geneva, Confederation of Switzerland, have invented certain new and useful Improvements in Submarine Paints, of which the following is a specification.

The present invention relates to the manufacture and the use of a submarine composition for painting the hulls of ships, which is based upon a wrapping up in a water-proof varnish, of a finely divided alloy or amalgam which is suitable to form a voltaic element in presence of sea-water.

Until now compositions are employed for painting the hulls of ships, which are rendered poisonous by means of pigments which are toxical by themselves such as Schweinfurth green, or by mixing with pigments such as ocher or minium, salts of copper, mercury or other metals, which are known as being toxical, or even oxids of copper, etc. All these paints answer more or less well the purpose of keeping clean the hull, because of the following reasons: The paints which contain metallic oxids or poisonous insoluble salts are not compounds of rapid ionization and if the submarine fauna is destroyed by their presence it is not always so for the Algæ which may adhere to the hull. The paints which contain salts such as cuprous chlorid, sulfate of copper, etc., are very active paints owing to the ionization of the salts in presence of water; nevertheless these paints have not an action of a long duration owing to the solubility in the water of the salts which they contain, and the seawater rapidly disintegrates the paint.

The composition which forms the object of the present invention, differs essentially from all those which are actually in use, by the poison which it contains and which is formed by an amalgam of mercury or an alloy suitable to form in presence of sea-water a voltaic element which can produce toxical bodies by decomposing the said sea-water. One can use for instance an amalgam containing 20 parts of copper and 4 parts of mercury, to which a pigment and a waterproof varnish are added. The proportions of the amalgam may moreover vary. This composition so obtained is extremely stable and forms a very powerful toxical composition of rapid ionization for the following reasons: As soon as the spores of Algæ or the mollusks attach to the paint, they attack and disintegrate the protective coat of varnish and make bare the particles of amalgam; immediately a voltaic element producing an electric current is formed which decomposes the ambient seawater by forming cuprous chlorid and corrosive sublimate (mercuric chlorid). Cuprous chlorid is always formed owing to the excess of copper of the amalgam. The cuprous chlorid and the sublimate form together a double salt of a very great toxical power, especially at the nascent state. At the same time the adjacent particles which have not been made bare remain inactive until new spores or mollusks arrive. At equal quantities of poison my paint will always be more toxical than the paints known until now, owing to the fact that in the salts and oxids the quantity of metal is inferior to the unity, while in the present case at the moment when my paint becomes active the poison which forms in it will be superior to the unity. My composition represents a composition for bottoms of ships having so to say an automatical action.

Example: 240 kilograms waterproof varnish, 70 kilograms red ocher or suitable pigment, 60 kilograms copper amalgam are mixed together in a roller grinding mill until the grinding is fine enough. The paint is then drawn off. The proportions of ocher and amalgam may vary according to the quality of the paint.

The film which the varnish forms in drying when applied adheres strongly to the hull and offers great resistance to the action of sea-water. But as soon as seaweed or mollusks become attached to the paint, a partial disintegration takes place, the amalgam being thereby exposed to the water in contact with which it forms an electric couple. By electrolysis the amalgam is decomposed in cations $\overset{+}{\text{Cu}}$ and anions $\overset{-}{\text{Hg}}$ which in presence of sea-water $$(2NaCl + xH_2O)$$

produce a double salt having the formula $$CuOHgCl_2 + H_2O \quad (I).$$

This salt has been described by M. Mailhe (*Comptes Rendus des Séances de l'Académie*

*des Sciences*, Paris 133, page 266). It is highly poisonous and prevents the growth of the seaweed, however it may dissolve in water; but as the copper is in excess in the amalgam containing but a small proportion of mercury, and owing to the influence of this copper a reduction takes place whereby a double salt is formed which is supposed to have the following formula:

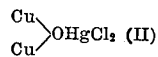

which salt is not soluble in water. But owing to oxidation and ionization, this salt is transformed into the salt having the formula (I), whereby cupric oxid (CuO) is produced. This reaction can be explained by the following equation:

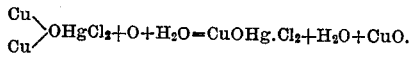

This process is renewed until all the excess of copper has been transformed. All the products obtained by these reactions take place at the surface of the paint, but only where the same is attacked by seaweed and mollusks, all the other unattacked parts remaining unaltered, form products which are insoluble but readily ionizable when attacked. The superiority of such a submarine paint in which the phenomena of electrolysis are increased by the phenomena of a double decomposition together with the forming of highly poisonous double salts, is easily recognized.

Instead of an amalgam there could be used powders of two different metals whatever as for instance copper and zinc or copper and tin in suitable proportions or any other alloy suitable to form in the presence of seawater a voltaic element able to produce by the decomposition of the water toxical bodies which destroy the mollusks and the Algæ which would attach to the hull covered with a composition made according to the present invention.

I claim:

1. A composition for coating surfaces exposed to the action of sea-water, such as the hulls of ships, consisting of an amalgam of copper and mercury and a body impervious to the action of water and with which the amalgam is intimately mixed, the said body forming a covering in which normally the amalgam is completely wrapped.

2. A composition for coating surfaces exposed to the action of sea-water, such as the hulls of ships, consisting of an amalgam of copper and mercury in the proportion of about five parts of copper and one part of mercury, and a body or vehicle with which the amalgam is intimately mixed in suitable proportions preferably comprising a pigment and a suitable water-proof varnish, said composition adapted to form in the presence of sea-water a voltaic element capable of decomposing the sea-water and producing toxical bodies for destroying mollusks and Algæ attempting to attach to said coated surfaces.

In testimony whereof I have affixed my signature in presence of witnesses.

HENRI TERRISSE.

Witnesses:
L. H. MUNICER,
G. VULLIN,
ROD. DE WURSTENBERGE.

---

Copies of this patent may be obtained for five cents each, by addressing the "Commissioner of Patents, Washington, D. C."